Aug. 16, 1932.  F. H. BEST  1,871,944
TRANSMISSION MEASURING SYSTEM
Filed Jan. 14, 1932
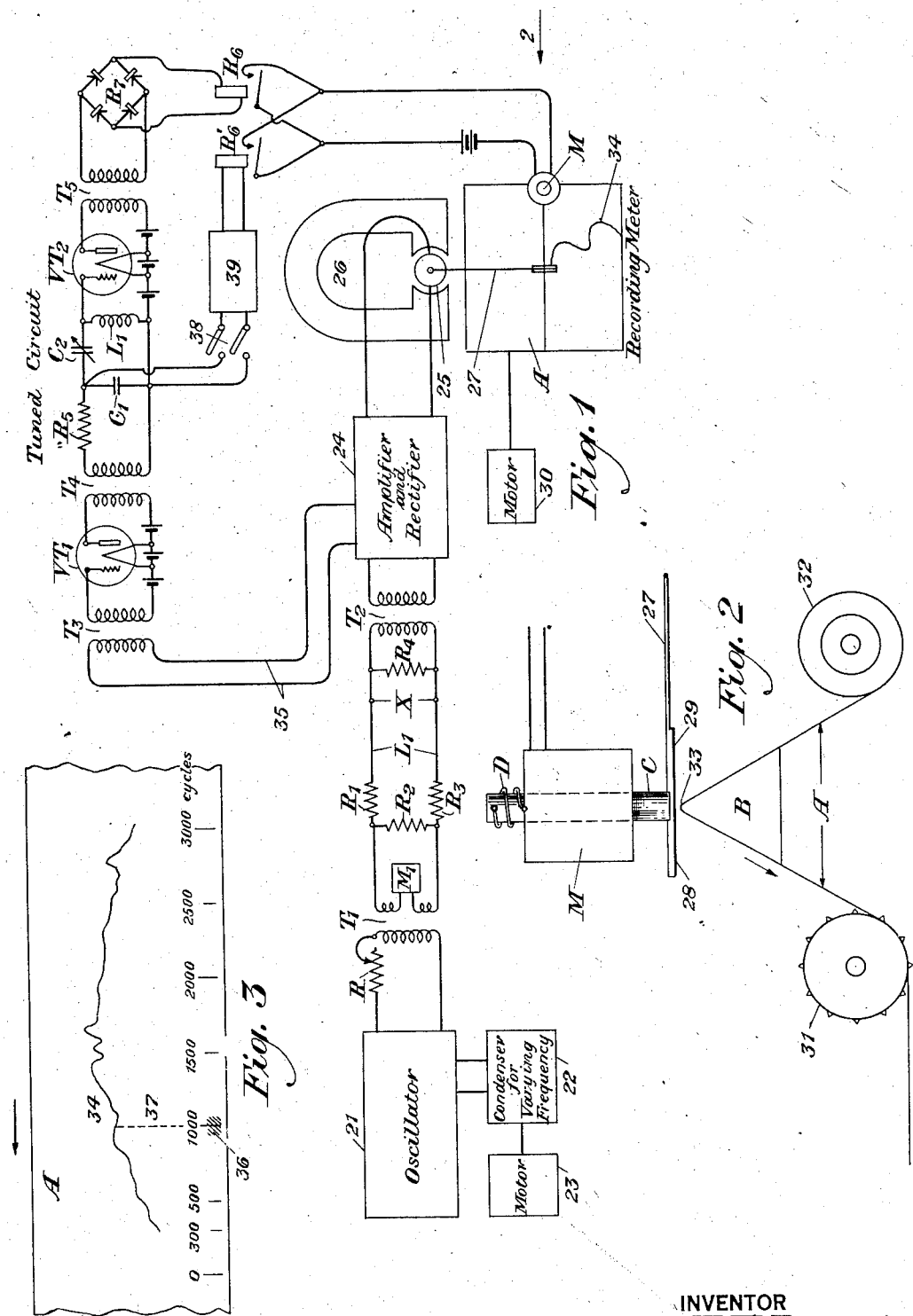
INVENTOR
F. H. Best
BY
ATTORNEY Patented Aug. 16, 1932

1,871,944

UNITED STATES PATENT OFFICE

FRED H. BEST, OF WESTFIELD, NEW JERSEY, ASSIGNOR TO AMERICAN TELEPHONE AND TELEGRAPH COMPANY, A CORPORATION OF NEW YORK

TRANSMISSION MEASURING SYSTEM

Application filed January 14, 1932. Serial No. 586,647.

It is among the objects of my invention to provide a new and improved system for the measurement of transmission at various frequencies through a transmission line or other transducer. Another object of my invention is to provide for recording the measurements in such a system and properly positioning a frequency scale in relation to the record. Still another object of my invention is to provide for varying the frequency systematically at the sending end of a transducer and moving a record sheet systematically at the receiving end and recording the transmission on the record sheet and making a mark on the record sheet at a particular frequency so that a scale of frequencies can easily be established on the sheet. All these objects, and various other objects and advantages of my invention will become apparent on consideration of an example of practice according to the invention which I have chosen for disclosure in the following specification. It will be understood that in this specification the description will refer principally to this particular example of the invention and that its scope will be indicated in the appended claims.

Referring to the drawing, Figure 1 is a diagram of a system showing one way in which my invention may be practiced; Fig. 2 is a diagrammatic elevation of a part of the Fig. 1 looking in the direction of the arrow 2 in Fig. 1; and Fig. 3 is a view of such a record as may be made with the apparatus of Figs. 1 and 2.

It is desired to measure the transmission in the line $L_1$ of Fig. 1. At the sending end on the left an oscillator 21 is provided, and the condenser for its frequency determining circuit is indicated at 22. This condenser is changed progressively in its capacity from one extreme of value to the opposite extreme of value by the motor 23. The time required for this change may be of the order of about 40 seconds. The output current from the oscillator 21, changing gradually in frequency from one extreme to the opposite extreme of a certain range, goes through the adjustable resistance R and the primary of the transformer $T_1$, inducing a corresponding current in the secondary of this transformer. In circuit with this secondary is a meter $M_1$ and by its indication the resistance R may be properly adjusted. The current in the circuit of the secondary winding of the transformer $T_1$ goes to the network $R_1$—$R_2$—$R_3$ adjusted at the proper impedance value and is then put on the line $L_1$.

At the other end of the line $L_1$, that is, at the terminals X, the received current is taken off through the transformer $T_2$ to the amplifier and rectifier combination 24, and from the output of this combination current goes to the moving coil 25 of a measuring instrument 26, of any suitable type. In one useful form of measuring instrument this moving coil 25 carries an index arm 27 which bears at its free end, between the points 28 and 29, a resistance conductor which is heated electrically by energy from a suitable source.

The motor 30 at the receiving end rotates the drum 31, drawing the paper strip A from the supply roll 32 and over the sharply curved edge 33 of the guide B. The paper strip A is chemically prepared so that the heat from the adjacent portion of the conductor 28—29 changes its color at that place. Accordingly, as the paper strip A is advanced, a mark 34 is made along its length and this mark shifts from side to side of the paper strip as the index arm 26 swings from side to side.

Supposing that the motor 23 starts the system at the sending end at frequency 300 cycles per second and gradually changes from that value to 3000 cycles per second, and that the paper strip shown in Fig. 3 moves in the direction of the arrow and has the mark 34 recorded thereon; it is desired to lay down a suitable frequency scale on this paper strip so that the ordinates of the curve 34 giving transmission values will be readily associated with their proper frequency values.

The motor 30 can be readily adjusted so that it will operate at a speed definitely related to that of the motor 23 and thus the desired frequency scale will be established in Fig. 3 except that we have yet to determine the location of some particular frequency along the length of the paper strip A. For this purpose the apparatus now to be described is more particularly intended.

From the amplifier-rectifier combination 24 a branch circuit 35 goes through the transformer $T_3$, amplifying tube $VT_1$, another transformer $T_4$, the network comprising the elements $R_5$, $C_1$, $C_2$ and $L_1$ connected as shown in the drawing, another amplifying tube $VT_2$, transformer $T_5$, and rectifier $R_7$ to the relay $R_6$. The network elements $C_2$ and $L_1$ just mentioned constitute a sharply selective tuned circuit which passes only a very narrow band of frequencies located at a convenient point in the range of testing frequencies. This narrow band may be regarded as substantially a single frequency which will be called the marking frequency. The condenser $C_1$ is a relatively high capacity condenser which, with the resistance $R_5$ limits the tendency of the impedance of the vacuum tube $VT_1$ to broaden the band of frequencies passed by the tuned circuit $C_2$—$L_1$. The condenser $C_1$ also permits the tuned circuit $C_2$—$L_1$ to be adjusted without affecting any other tuned circuits which may be connected in parallel with it as when the switch 38 is closed. The rectifier $R_7$ converts the alternating current from the transformer $T_5$ to direct current which is preferable for operating the relay $R_6$. The relay $R_6$ controls a circuit to the magnet M, and when this is energized it depresses its armature C against the spring D and the armature C presses on a spot of the paper A between it and the guide B and makes a mark at that point at that time.

In the case supposed heretofore, when the frequency at the sending end is varied progressively over the range from 300 cycles per second to 3000 cycles per second, no substantial quantity of energy gets through the tuned circuit $L_1$—$C_2$ except at the marking frequency which may be, for example, 1000 cycles per second. But at the time when that frequency is being transmitted, the selective circuit $L_1$—$C_2$ passes energy therethrough and the relay $R_6$ is energized and, for a brief interval of time, the magnet M is energized and marks a spot on the paper A. This marked spot is shown at 36 in Fig. 3. Accordingly, the corresponding ordinate 37 gives the intensity of the received current at a frequency of 1000 cycles per second. Moreover, having the speed of the record sheet A definitely related to the rate at which the motor 23 varies the frequency at the sending end, it becomes possible to lay off a frequency scale along the edge of the sheet A, and this has been done in Fig. 3 with calibrations at 300, 500, 1000, and so on to 3000 cycles. A rubber stamp may be prepared carrying the scale shown along the lower edge of the paper A in Fig. 3, and after the records like those shown at 34 and 36 in Fig. 3 have been made, the stamp may be positioned to bring the marking frequency such as 1000 cycles opposite the mark 36 on the paper and then an impression made giving the complete frequency scale as shown in Fig. 3.

Different stamps may be employed with longer or shorter frequency ranges, but all comprising the marking frequency within those ranges. Then when a record is made for a short range, the corresponding short scale stamp may be employed, and for a long range, a corresponding long scale stamp may be employed. In this way it will only be necessary to take record strips of the length of the desired record and stamp the corresponding frequency scales on them accordingly.

Thus it becomes unnecessary to observe any particular precaution for starting the two motors 23 and 30 together. Generally the motor 30 will be set going before the motor 23, and when the motor 23 starts it will start the curve like 34 in Fig. 3, and after the curve has been recorded the paper will be taken from the recording meter and by the aid of the mark that has been stamped at 36 the frequency scale will be established in its proper place along the length of the paper strip.

If desired, the switches 38 in Fig. 1 may be closed, thus energizing the relay $R'_6$ at a different frequency, say, 1500 cycles per second, in the same way that the relay $R_6$ is energized for 1000 cycles. The box 39 represents apparatus similar to that extending to the right from the condenser $C_1$ across the top of Fig. 1. With the switches 38 closed, two marks will be made on the record sheet, one at 1000 cycles per second and another at 1500 cycles per second. In this case it will not be absolutely necessary to establish the relative speeds of the motors 23 and 30 but it will be sufficient to know that each is uniform during the test. After the record sheet is taken out, the two points that have been marked at 1000 cycles and 1500 cycles will enable one to lay down the entire frequency scale along the edge of the record sheet, though it may not be practicable to use a fixed rubber stamp for this purpose in this case.

I claim:

1. The method of measuring transmission through a transducer at various frequencies, which consists in applying currents of those frequencies to the transducer in order, measuring the output from the transducer, recording the measurements by the adjustment of a measuring index across a moving record sheet and also applying a particular frequency narrowly selected to make a record mark on said sheet whereby a frequency scale may be established along said sheet.

2. In the measurement and recording of transmission as a function of varying frequency, the method of establishing a frequency scale on the record, which consists in applying a particular frequency selectively to mark a datum point on the record.

3. An oscillator, means to adjust it for frequency in definite order, a transducer to which its output is applied, a record sheet moved in correspondence with the adjustment of the oscillator, a measuring instrument connected to be actuated by the output from the transducer, a recording index actuated by said measuring instrument and movable across the direction of movement of said sheet, a stationary marker adjacent to said sheet, and means selectively responsive to a certain frequency received over the transducer to actuate said marker.

4. A transducer, means to apply a current on one side thereof, means to vary this current on that side in a certain respect, means to measure and record this current on the other side, means to move a record sheet to receive the record of such measurement, and means responsive to a certain stage of the current on the sending side to make a mark on said record sheet whereby a scale can be established thereon corresponding to the variation of the current on the sending side.

5. An oscillator, means to adjust it for frequency in definite order, a transducer to which its output is applied, a record sheet moved in correspondence with the adjustment of the oscillator, a measuring instrument connected to be actuated by the output from the transducer, a recording index actuated by said measuring instrument and moved across the direction of movement of said sheet, a stationary marker adjacent to said sheet, a branch circuit from the output of said transducer, said branch circuit being narrowly selective to a particular frequency, and a relay responsive to current of that frequency to actuate said marker.

In testimony whereof, I have signed my name to this specification this 12th day of January, 1932.

FRED H. BEST.